United States Patent [19]
Dasch et al.

[11] Patent Number: 5,433,906
[45] Date of Patent: Jul. 18, 1995

[54] COMPOSITE OF SMALL CARBON FIBERS AND THERMOPLASTICS AND METHOD FOR MAKING SAME

[75] Inventors: Cameron J. Dasch, Bloomfield Hills, Mich.; Robert L. Alig, Dayton, Ohio

[73] Assignee: General Motors Corporation, Detroit, Mich.

[21] Appl. No.: 88,027

[22] Filed: Jul. 9, 1993

[51] Int. Cl.6 .......................... B29B 9/08; B29B 9/12; B29B 9/14

[52] U.S. Cl. .................................. 264/117; 264/29.1; 264/29.2; 264/109; 264/112; 264/113; 264/115; 264/210.7; 264/DIG. 57; 428/402; 428/409

[58] Field of Search ....................... 264/29.1, 29.2, 109, 264/115, 112, 117, 113, 210.7, DIG. 57; 428/402, 409

[56] References Cited

U.S. PATENT DOCUMENTS

| | | | |
|---|---|---|---|
| 3,278,661 | 10/1966 | Beck | 264/117 X |
| 4,500,603 | 2/1985 | Freundlich | 428/409 |
| 4,600,572 | 7/1986 | Hiramatsu et al. | 264/29.2 |
| 4,663,230 | 5/1987 | Tennent | 428/367 |
| 4,774,304 | 9/1988 | Kuhls et al. | 264/117 X |
| 5,024,818 | 6/1991 | Tibbetts et al. | 422/158 |
| 5,055,371 | 10/1991 | Lee et al. | 264/210.7 |
| 5,116,561 | 5/1992 | Kagawa | 264/117 X |
| 5,185,204 | 2/1993 | Shimizu et al. | 428/402 |

OTHER PUBLICATIONS

Handbook of Fillers and Reinforcements for Plastics (no date indicated), Edited by Katz et al., Van Nostrand Reinhold Co., pp. 562–582.

Dynes et al., J. Adhesion, 1974, vol. 6, pp. 195–206.

*Primary Examiner*—Robert A. Dawson
*Assistant Examiner*—Dennis J. Chismar
*Attorney, Agent, or Firm*—George A. Grove

[57] ABSTRACT

A method is provided for forming a composite material and article using nanometer-size vapor grown carbon fibers. The preferred carbon fibers are characterized by diameters of substantially less than about one micrometer, and more typically less than about 0.2 micrometers, and are of the type formed by a continuous gas phase reaction. The polymeric matrix of the composite material is formed from a thermoplastic resin having a surface tension which is sufficiently low, so as to promote wetting of the surfaces of the nanometer-size carbon fibers. The thermoplastic resin is mixed with the carbon fibers and a solvent so as to granularize the mixture and thereby facilitate subsequent handling and mixing of the carbon fibers. Final mixing occurs at temperatures near the melting point of the thermoplastic resin and for a duration which is sufficient to ensure that the carbon fibers are adequately wetted by the thermoplastic resin, so as to provide adhesion between the fibers and the thermoplastic. The composite material is characterized by improved strength and stiffness.

17 Claims, 1 Drawing Sheet

COMPOSITE OF SMALL CARBON FIBERS AND THERMOPLASTICS AND METHOD FOR MAKING SAME

The present invention generally relates to composites formed from small diameter carbon fibers. More particularly, this invention relates to a method for making such composites with carbon fibers having diameters of less than about one micrometer which are dispersed in a thermoplastic having a relatively low surface tension, such that the thermoplastic sufficiently wets the surfaces of the carbon fibers so as to provide adhesion between the fibers and the thermoplastic, whereby a composite material having improved strength and stiffness is formed.

BACKGROUND OF THE INVENTION

Composite materials composed of filler materials dispersed in a polymeric matrix are known to exhibit mechanical properties, such as stiffness, strength and toughness, and physical properties, such as coefficient of thermal expansion and electrical and thermal conductivities, which are superior to the polymeric matrix alone. In particular, composite materials formed using carbon fibers dispersed in an epoxy resin have found uses in both the automotive and aerospace industries due to their excellent strength and stiffness per unit weight, as well as their desirable electrical and thermal properties. Generally, optimum mechanical properties for carbon fiber composites are attained with collimated fiber structures within an essentially void-free epoxy matrix. To eliminate the formation of voids, the fibers are typically surface treated to enhance the wettability of the fibers by the epoxy resin.

Carbon fibers are generally produced by heat treating a carbon-containing raw material, such as rayon, acrylic, and polyacrylonitrile (PAN), usually in the form of a polymer fiber. Most commercial products formed from carbon fiber composites utilize carbon fibers derived from PAN. However, the cost of forming these carbon fibers has inhibited the use of carbon fiber composites in many commercial applications.

Recently, manufacturing processes have been developed which are able to produce carbon fibers at significantly lower costs. In particular, U.S. Pat. No. 5,024,818 to Tibbetts et al, assigned to the assignee of this invention, teaches a method and apparatus by which carbon fibers can be catalytically grown by a vapor deposition process from hydrocarbons. The carbon fibers produced by the method taught by Tibbetts et al are generally nanometer-size (i.e., less than about one micrometer in diameter) and therefore significantly smaller than carbon fibers conventionally available, which are generally at least about one micrometer in diameter, and more often on the order of at least about seven micrometers in diameter. In addition, the fibers produced by the method taught by Tibbeus et al are relatively short, with lengths typically on the order of about 40 to about 200 micrometers, and perhaps as small as five micrometers or less. Therefore, such fibers are generally too small to allow the properties of the individual fibers to be measured directly.

Potentially, composite articles formed from nanometer-size carbon fibers would have a microscopically smooth surface, which is highly desirable from an aesthetics standpoint. Furthermore, the potentially low cost of such nanometer-size fibers would make the use of carbon fiber-reinforced composites more economically feasible for a wide variety of applications.

However, there are several significant disadvantages associated with nanometer-size, vapor-grown carbon fibers, such as those taught by Tibbetts et al, which have substantially prevented the production of composite materials made from these fibers. Firstly, nanometer-size fibers are difficult to handle. A mass of nanometer-size carbon fibers has an extremely low apparent density (on the order of less than about $1 \times 10^{-3}$ grams per cubic centimeter). Consequently, a quantity of such fibers is difficult to use, and furthermore, a larger volume of these fibers is generally required to obtain a composite composed of a suitably high weight percent of fibers. Secondly, it is very difficult to sufficiently mix nanometer-size fibers with a polymeric material because a high viscosity mixture results when significant amounts of fibers are used, such as on the order of about 5 to about 40 volume percent. Thirdly, the small size of the fibers creates a potential health hazard from inhalation when the fibers are dispersed.

Finally, the vapor-grown carbon fibers are not readily wettable because the basal graphite planes of the fibers are arranged in concentric circles so as to form a low energy surface. Consequently, conventionally-used epoxies will not readily adhere to the fibers, such that the mechanical properties of the composite are reduced by the presence of voids within the matrix. Notably, degradation of tensile strength due to poor adhesion can result in a composite having a lower tensile strength than the epoxy alone, i.e., without the inclusion of carbon fibers. While surface treatments of carbon fibers derived from PAN are often employed to promote wetting and adhesion, such treatments have not succeeded in promoting the wetting of nanometer-size carbon fibers.

Also, as noted above, nanometer-size carbon fibers are too small to allow the properties of the individual fibers to be measured directly. Because prior efforts have failed to successfully produce a composite article with sufficient adhesion between a polymeric matrix and nanometer-size carbon fibers, indirect measurements of the mechanical properties of such fibers have also been essentially prevented. Accordingly, the utility of composite articles reinforced with nanometer-size carbon fibers is not well defined.

Thus, it would be desirable to provide a method by which relatively low cost, nanometer-size, vapor-grown carbon fibers can be utilized to form composite materials, such that composite articles exhibiting suitable mechanical and physical properties can be made, while simultaneously overcoming the above-noted handling and processing difficulties associated with nanometer-size vapor-grown carbon fibers.

SUMMARY OF THE INVENTION

It is an object of this invention to provide a method for forming composite materials with small diameter carbon fibers.

It is a further object of this invention that such a method encompass processing and resin selection techniques which enhance the wetting of such small diameter carbon fibers, such that composite materials formed therefrom are characterized by enhanced mechanical, electrical and thermal properties.

Lastly, it is still a further object of this invention that such a method promote handling and processing of such carbon fibers.

In accordance with a preferred embodiment of this invention, these and other objects and advantages are accomplished as follows.

According to the present invention, there is provided a method for processing nanometer-size vapor-grown carbon fibers so as to form composite materials characterized by suitable mechanical, electrical and thermal properties for many automotive and aerospace applications. In particular, the method promotes wetting of the carbon fibers to enhance adhesion between the fibers and a preferred polymeric matrix, and promotes processing of the fibers by reducing the volume of the fibers as the fibers and polymer are being mixed. In addition, the process involves granularizing the fibers so as to facilitate subsequent processing.

The method of this invention includes removing any volatile materials from a quantity of vapor-grown carbon fibers having a diameter of substantially less than about one micrometer. More typically, such carbon fibers will have a diameter of less than about 0.2 micrometers. The carbon fibers are then blended with a suitable thermoplastic resin to form a mixture. A solvent is added either after the fibers and thermoplastic resin have been dry mixed or, alternatively, directly to the thermoplastic resin prior to adding the fibers. With either approach, the mixture is blended for a duration which is sufficient to slightly dissolve the thermoplastic resin and granularize the mixture, such that granules composed of fibers and thermoplastic resin are formed. With each of the above alternative processing steps, a sufficient amount of solvent must be used to allow the fibers to readily slip past each other while being mixed so as to promote densification of the mixture.

Next, the granulated mixture is dried so as to remove the solvent from the granules and then high shear mixed at a sufficient temperature and for a sufficient duration to form a composite material. Specifically, shear mixing is initiated at a temperature near the melting temperature of the thermoplastic resin so as to lower the viscosity of the granulated mixture. Shear mixing further raises the temperature of the granulated mixture such that the melting temperature of the thermoplastic is exceeded. The mixture can then be molded or otherwise formed to produce a composite article.

The use of a thermoplastic resin in accordance with this invention reduces the viscosity of the mixture when heated, such that the fibers and resin can be mixed for extended periods at temperatures near the melting temperature of the resin. Accordingly, dispersion of the carbon fibers in the resin is promoted by the extended duration over which the fibers and thermoplastic resin are able to be mixed. In addition, a preferred thermoplastic resin in accordance with this invention is particularly selected to have a surface tension of less than about 45 dynes per centimeter at about 20° C., so as to further promote wetting of the fiber surfaces.

Granularizing the mixture with a suitable solvent in accordance with this invention is performed to promote handling of the fibers, as well as to eliminate the potential hazard from inhalation of the dispersed fibers. The solvent allows the carbon fibers to move relative to each other, thereby reducing the mixture volume. Some of the thermoplastic resin which has been dissolved is deposited on the fibers and dries during mixing, thereby binding the fibers together and granulating the mixture. Granulating stabilizes the fibers for purposes of handling during subsequent mixing and molding.

The method of this invention permits the use of nanometer-size vapor-grown carbon fibers in a composite article. The use of such fibers is advantageous in that carbon fiber composite articles formed with these fibers exhibit excellent strength and stiffness per unit weight, have desirable electrical and thermal properties, possess high surface quality in that the fibers are substantially absent at the surface of the article, and are potentially lower in cost relative to conventional carbon fiber composites as a result of using lower cost vapor-grown carbon fibers.

Other objects and advantages of this invention will be better appreciated from the following detailed description.

BRIEF DESCRIPTION OF THE DRAWINGS

The above and other advantages of this invention will become more apparent from the following description taken in conjunction with the accompanying drawing wherein.

DETAILED DESCRIPTION OF THE INVENTION

Figure 1:
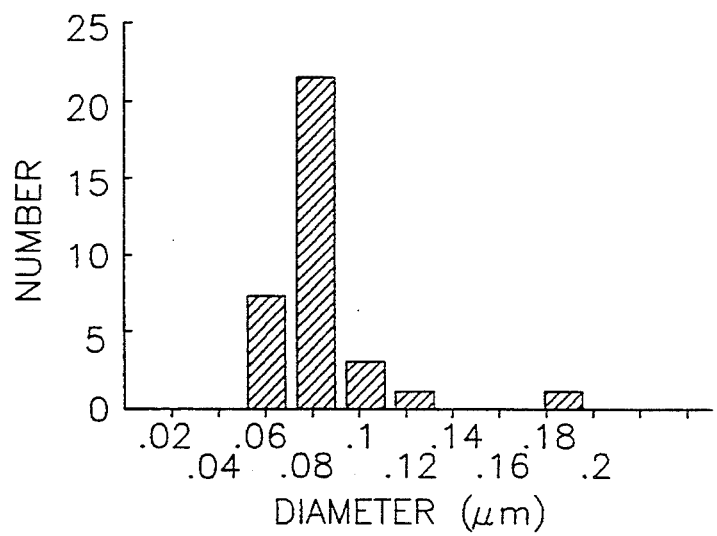
FIGS. 1, 2, 3 graphically illustrate the size distribution of the preferred vapor-grown carbon fibers used in accordance with this invention.

A method is provided for forming a composite material and article using nanometer-size vapor-grown carbon fibers. The preferred carbon fibers of this invention are grown in accordance with U.S. Pat. No. 5,024,818 to Tibbetts et al and are characterized by diameters of substantially less than about one micrometer. Tibbetts et al teach a preferred apparatus for forming such carbon fibers in a continuous gas phase reaction, wherein fibers are catalytically grown by a vapor deposition process from hydrocarbons. The process taught by Tibbetts et al advantageously yields carbon fibers which are potentially less costly to produce than conventionally known processes.

Carbon fibers formed in accordance with Tibbetts et al are characterized by a diameter of less than about 0.2 micrometers and a length of up to about 200 micrometers, and as little as about five micrometers and less. In addition, the fibers are characterized by having an apparent density of less than about 0.02 grams per cubic centimeter, and more typically between about 0.0003 to about 0.01 grams per cubic centimeter. The carbon fibers are also substantially soot-free, which is a highly desirable attribute from the standpoint of optimizing the mechanical, electrical and thermal properties of a composite material formed with the fibers.

While the above dimensional characteristics of the preferred carbon fibers were obtained in accordance with the teachings of Tibbetts et al, other methods could be foreseeably employed to produce suitable nanometer-sized carbon filters. Accordingly, the teachings of this invention are not to be construed as being limited by the teachings of Tibbetts et al.

The preferred polymeric matrix material in accordance with this invention is a thermoplastic resin having a surface tension of less than about 45 dynes per centimeter at about 20° C., which is substantially lower than epoxy resins conventionally used to form carbon fiber-reinforced composites (e.g., about 50 dynes per centimeter at about 20° C.), and particularly thermoplastic resins having a non-polar surface. Exemplary thermoplastics resins which meet the criterion for surface tension include polycarbonates (PC), an example of which is bisphenol A polycarbonate available from General Electric Company under the name LEXAN, polyethylene (PE), and polyethylene terephthalate (PET). However, it is foreseeable that even polar materials, such as nylon 6,6, could also be used. At about 20° C., polycarbonates have a surface tension of about 35 dynes per centimeter, polyethylenes have a surface tension of about 33 dynes per centimeter, polyethylene terephthalate has a surface tension of about 43 dynes per centimeter, and nylon 6,6 has a surface tension of about 42 dynes per centimeter. Accordingly, each of these thermoplastic resins are able to more readily wet the surface of the preferred nanometer-size carbon fibers described above.

As thermoplastics, each of the preferred resins do not crosslink irreversibly when heated above their respective melting points. As a result, processing of a composite mixture containing the preferred thermoplastic resins and the preferred carbon fibers can be carried out at temperatures which are sufficient to melt the resin and significantly lower the viscosity of the mixture and for a duration which is sufficient to ensure that the carbon fibers are adequately dispersed by the thermoplastic resin. Such methods are not possible with thermoset epoxies, which irreversibly crosslink at elevated temperatures.

The preferred process for making a composite article in accordance with this invention includes baking the nanometer-size, vapor-grown carbon fibers at an elevated temperature in a flowing inert gas for a time sufficient to remove large aromatic molecules from the surfaces of the fibers. For example, the carbon fibers may be baked at about 400° C. for a duration of at least one hour, though durations of less than an hour are permissible if the carbon fibers are baked at higher temperature. While surface treatments are known in the prior art for enhancing the wettability of carbon fibers, such procedures are not necessary for processing the preferred carbon fibers of this invention in view of the present method, as described below. However, it is foreseeable that conventional surface treatments may be desirable under certain conditions.

The carbon fibers are then mixed with the thermoplastic resin, which is provided in a powdered form. One mixing technique in accordance with this invention is to dry mix the carbon fibers and the thermoplastic resin together at room temperature to form a powdered mixture. As previously noted, the carbon fibers are extremely small and have a low apparent density (about 0.0015 grams per cubic centimeter), such that handling of the fibers is difficult. Accordingly, with this technique, the powered mixture is granularized by adding a small amount of solvent to the mixture while the mixture is continuously being mixed at room temperature. An alternative mixing technique in accordance with this invention is to premix the solvent with the thermoplastic resin prior to mixing with the carbon fibers. With either approach, the solvent is added in sufficient amounts to slightly dissolve the thermoplastic resin. In the presence of carbon fibers, granules are formed having a diameter of up to about 10 millimeters. A suitable solvent is one which will sufficiently dissolve the particular thermoplastic used and which can be subsequently removed without excessive difficulty. Examples of such solvents include acetone for polycarbonate and trifluoroethanol for nylon 6,6. After the solvent is added, mixing continues for a duration which is sufficient to penetrate the mixture with the solvent.

If desired, the granules formed by the above process can be sorted by screening the mixture through a suitable sieve, and then further pelletizing the granules which pass through the sieve by adding further amounts of solvent. Such an additional step may be desirable where the granulates are to be mixed with other pelletized resins or to improve metering of the granulates into an extruder or an injection molder.

The mixture is then dried in a vacuum at a typical drying temperature for the particular thermoplastic resin used and for a duration sufficient to remove the solvent and any water which may be contained within the mixture. After drying, the resulting granularized mixture has an apparent density of about 0.1 grams per cubic centimeter. The dried, granularized mixture is then further mixed by strong shearing at a temperature and for a duration sufficient to disperse the carbon fibers within the thermoplastic resin. Generally, shear mixing is initiated at a temperature near the melting temperature of the thermoplastic resin so as to lower the viscosity of the granulated mixture, with the temperature of the granulated mixture eventually being raised above the melting temperature of the thermoplastic by the shear mixing operation.

It is evident that the temperature at which shear mixing is initiated will depend on the type of shear mixing equipment and/or thermoplastic employed. Specifically, the preferred shear mixing temperature will depend on the melting temperature of the particular thermoplastic and the maximum mixing duration which the materials will allow, which can generally be dependent on the thermal degradation of the thermoplastic as well as breakage of the carbon fibers during mixing. The preferred shear mixing temperature may also vary with the amount of carbon fibers present in the mixture, as will be noted below.

Various known types of equipment can be used to shear mix the granulated mixture, such as a Brabender mixing bowl for processing small quantities and a twin screw extruder for processing production quantities, as well as numerous other known processing equipment and techniques. Generally, depending on the type of equipment used, the length of time over which the ingredients are shear mixed may vary so as to ensure that adequate mixing of the ingredients occurs.

After shear mixing, the mixture is ready for forming by any suitable means, including compression molding and injection molding techniques. Due to the very small size of the carbon fibers, the carbon fibers will typically be randomly oriented within the resulting mixture. Some degree of alignment may be achievable in the final composite article, especially if produced by injection molding. Such composite articles are also characterized by having a microscopically smooth surface which is virtually free of carbon fibers.

To evaluate composite articles formed in accordance with this invention, sample batches of composite materials were prepared to contain the preferred nanometer-size vapor-grown carbon fibers in a matrix of the bisphenol A polycarbonate. Batches were formulated to contain 10, 20, 30 and 40 weight percent carbon fiber, with one batch being prepared without carbon fibers so as to serve as a baseline.

Figure 2:
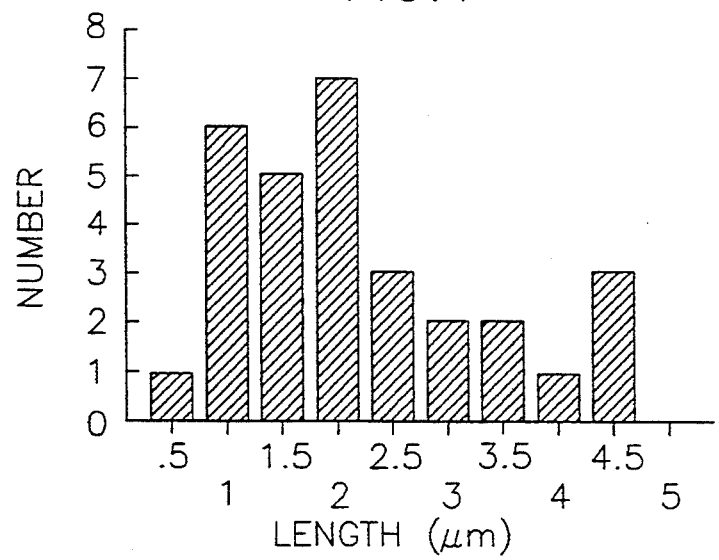
Figure 3:
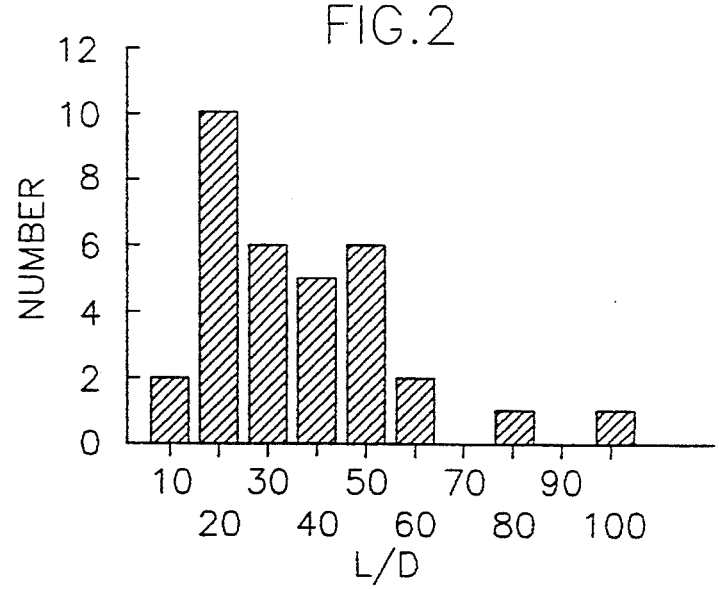

The dimensional characteristics of the carbon fibers which were utilized in accordance with this invention are depicted in FIGS. 1, 2, 3. Bulk fiber samples possessed an apparent density of less than about 0.0015 grams per cubic centimeter, which is indicative of relatively long fibers and low soot concentrations. Prior to being analyzed, the fibers were baked at about 600° C. in flowing nitrogen gas for about one hour to remove polynuclear aromatics and other volatiles from the surfaces of the fibers.

The data represented in FIGS. 1, 2, 3 were obtained by dispersing a quantity of the fibers in chloroform and then analyzing the fibers using a scanning electron microscope. FIG. 1 indicates that the diameters of the fibers exhibited a narrow distribution, with the vast majority of fibers having diameters of no more than about 100 nanometers (0.1 micrometers). The average diameter for the sample was about 78 nanometers with a standard deviation of about 21 nanometers.

In contrast, FIGS. 2 and 3 indicate that the distribution was much wider for the lengths and the length-over-diameter ratios (L/D) of the fibers. The mean length was about 2.5 micrometers, with a standard deviation of about 2.0 micrometers and a maximum length of about 4.5 micrometers. The mean L/D was about 32 with a standard deviation of about 20. The uncertainty of the mean L/D was about ±12 at the 90% confidence level.

The batches were prepared in accordance with the preferred process described above. After being baked at about 600° C., the carbon fibers were dry mixed by open stirring at room temperature with the polycarbonate resin, which was used in a powdered form. The powered mixture was then granularized by adding 200 milliliters of acetone for every 100 grams of the powdered mixture as the mixture was being continuously mixed. The amount of acetone used was sufficient to slightly dissolve the polycarbonate and to allow the carbon fibers to move relative to each other, such that granules were formed having a diameter of up to about ten millimeters. Mixing was carried out for a duration of about five minutes. The granules were then screened through a #8 sieve, with the particles passing through the sieve being further granularized by the addition of about 20 milliliters of acetone for every 10 grams of the remaining mixture.

The granularized mixture was then dried in a vacuum at a temperature of about 120° C. for at least twelve hours, which was sufficient to remove the acetone and any water which was present within the mixture. After drying, the resulting granularized mixture had an apparent density of about 0.1 grams per cubic centimeter.

The dried, granularized mixture was then further prepared by strong shearing in a Brabender mixing bowl at 75 rpm using roller blades. Shear mixing was carried out at a temperature above the melting temperature of the polycarbonate resin (about 290° C.) for a duration of about ten minutes. The specific temperatures at which the samples were shear mixed varied with the amount of carbon fibers present in the mixture so as to compensate for the higher viscosity associated with a greater concentration of carbon fibers in a mixture. The batches containing 0, 10 and 20 weight percent carbon fibers were shear mixed at 300° C., while the batches containing 30 and 40 weight percent carbon fibers were shear mixed at about 310° C.

Tensile and flexural specimens were then compression molded in a hot press at about 260° C. with an applied pressure of about 1000 psi for about three minutes. The pressure was released twice in order to overcome the viscoelastic properties of polycarbonate. The mold was then sufficiently cooled to permit removal of the specimens.

The above molding process resulted in composite specimens having a random (3D) orientation due to the very small size of the fibers. The tensile specimens were sized in conformance with American Society for Testing and Materials (ASTM) D638 Type V, while the flexural specimens were sized in conformance with ASTM D790. Visual inspection of the specimens indicated that they were free of bubbles.

The mechanical and physical properties of the specimens are provided in Table I below, which compares the 10, 20, 30 and 40 weight percent carbon fiber-filled polycarbonate specimens with the specimens formed without use of carbon fibers.

TABLE I

| | Fiber Content | | | | |
|---|---|---|---|---|---|
| Weight percent | 0 | 10 | 20 | 30 | 40 |
| Volume percent | 0 | 6.3 | 13.0 | 20.5 | 28.6 |
| Density (g/cm$^3$) | 1.13 | 1.17 | 1.22 | 1.35 | 1.41 |
| Therm. conductivity (W/m/K) | 0.19 | 0.22 | 0.27 | 0.33 | 0.43 |
| Resistivity ($\Omega$m) | >1 × 10$^5$ | >1 × 10$^5$ | 4.3 × 10$^3$ | 2.5 | 2.1 × 10$^{-3}$ |
| Tensile Strength at Yield (MPa) | 70 | 72 | 76 | 71 | 24 |
| Flexural Strength at Yield (MPa) | 87 | 69 | 82 | 75 | 22 |
| Flexural Strain at Yield (%) | 5.2 | 2.0 | 1.8 | 0.5 | — |
| Flexural Modulus (MPa) | 2200 | 2000 | 3700 | 4500 | 4500 |
| Elongation at Yield (%) | 17 | 15 | 8 | — | — |
| Elongation at Break (%) | 100 | 60 | 12 | — | — |

The densities indicated above represent 94 to 99 percent of the full density expected if the molecular volumes of the materials did not change within the composite. Such densities indicated the presence of moderate porosity which may somewhat degrade the properties of the composite material from those which would be optimally obtainable.

Thermal conductivity was measured at room temperature using a Lafayette Instruments TC-1000 thermal comparator. As can be seen from the table, the thermal conductivity significantly increased with fiber loading as compared to the baseline polycarbonate specimen.

Electrical resistivity of the specimens was measured to assess the potential for electrostatic painting and the electromagnetic shielding capability of composite articles formed from composite materials prepared in accordance with this invention. As measured with an ohm meter, the resistances of the specimens were sufficiently low to be measured only at fiber loadings of greater than about 10 weight percent. As can be seen from the table, resistance depended much more dramatically on fiber volume fraction than the other transport properties, i.e., those properties of the composite which involve the transport of heat (thermal conductivity) or stress (tensile and flex moduli). The apparent exponential drop of the resistivity with volume fraction is indicative of transport which depends on tunneling of electrons between the fibers in a percolation network. By contrast, the mechanical and thermal properties of the specimens apparently depended on mean transport through the composite material.

The tensile properties were measured in accordance with ASTM D638. The specimens were Type V (63.5 millimeters by 9.5 millimeters) with a nominal thickness of about 3.2 millimeters. Hydraulic grips were used for the 0, 10 and 20 weight percent specimens, while manual grips were used for the 30 and 40 weight percent specimens.

The fiber-free specimens and the 10 weight percent specimens exhibited a peak in their respective stress-strain curves, such that these specimens yielded at a high load before breaking at a lower load. The maximum stresses attained are indicated as the "Tensile Strength at Yield" in Table I. The specimens containing the higher fiber loadings were more brittle, such that they broke at their respective yield points. At fiber loadings of up to 30 weight percent, the composites showed nominal improvements in strength relative to the fiber-free polycarbonate specimens. It is predicted that higher strengths may be attained by aligning the carbon fibers within the matrix. It is anticipated that at least partial alignment could be achieved if the specimens had been injection molded instead of compression molded.

The 40 weight percent specimens were difficult to make, often cracking during molding or when being removed from the mold. Other 40 weight specimens cracked when the grips were applied. Such occurrences indicated that large residual stresses were created within the specimens by the molding and subsequent cooling of these specimens. Only one specimen eventually survived but exhibited substantially lower tensile strength, as can be seen from Table I. Such a result is similar to prior art attempts to form composites loaded with PAN carbon fibers at 40 weight percent.

The flexural properties of the specimens were measured in accordance with ASTM D790. The specimens were about 63.5×12.7×3.2 millimeters and were flexed at about 1.3 millimeters per minute across an approximately 51 millimeter span. Due to the greater mass of these specimens, molding was somewhat more difficult, and bubbles were visible on many of the specimens.

The measured flexural behavior of the flexural specimens was similar to the tensile behavior of the tensile specimens discussed above. Flexural specimens with lower fiber loadings underwent a high load yield point before breaking. As with the tensile specimens, flexural strength changed little as the amount of fibers increased up to 30 weight percent. At 40 weight percent, the specimens exhibited only about half of the strength of the fiber-free specimens. An increase in brittleness for the flexural specimens with an increase in fiber loading can be seen by the "Flexural Strain at Yield" values of Table I. At high fiber loadings, flexural specimens tended to break at only a few percent strain.

The primary benefit of the nanometer-size vapor-grown carbon fibers used in the specimens tested was increased stiffness, as reflected by the flexural modulus values given in Table I. At the 30 weight percent fiber loading, the stiffness was approximately twice that of the fiber-free specimens.

Scanning electron micrographs of the specimens after fracture indicated that the carbon fibers were wetted by the polycarbonate resin, with voids being absent around the fibers in the fracture surfaces. Furthermore, the polycarbonate matrices adhered sufficiently well to the carbon fibers to form tendrils as a result of the large strain field. As noted before, the outer molded surfaces of the specimens showed no evidence of fibers, either under optical or electron microscopy. Such a result further confirms that the nanometer-size carbon fibers were sufficiently wetted, such that they were completely enveloped within the polycarbonate matrix.

From the above, it can be seen that the polycarbonate resin wetted and adhered well to the nanometer-size carbon fibers, such that composite articles exhibiting suitable mechanical and physical properties were obtained. The mechanical properties of the specimens permit the mechanical properties of the nanometer-size vapor-grown carbon fibers to be inferred, based on the estimated random fiber orientation and the L/D ratio of the fibers. Generally, it appears that the nanometer-size carbon fibers of this invention are comparable in tensile strength to longer vapor-grown carbon fibers of the type known in the prior art. The flexural modulus allowed a direct determination of the tensile modulus of the nanometer-size carbon fibers, which again was comparable to longer vapor-grown carbon fibers of the type known in the prior art.

The 30 weight percent composite specimens exhibited characteristics which would make such composite materials potentially suitable for a wide variety of structural applications. These specimens were about two to three times stiffer than the fiber-free polycarbonate specimens and were relatively conductive (>0.01 per ohm,centimeter). Such attributes make composite materials loaded with 30 weight percent of the carbon fibers potentially suitable for such automotive applications as body panels.

From the above, it can be seen that a significant advantage of the present invention is that a method is provided by which nanometer-size vapor-grown carbon fibers can be utilized to form composite articles having suitable mechanical and physical properties for numerous structural applications. Generally, the use of carbon fibers is advantageous in that composite articles formed with such fibers exhibit excellent stiffness and strength per unit weight and have desirable electrical and thermal properties. In addition, composite articles formed with the nanometer-size vapor-grown carbon fibers utilized by this invention exhibit excellent surface quality in that the fibers are substantially absent from the articles surface. In addition, such composite articles are potentially lower in cost relative to composite articles formed with conventional carbon fiber composites in that the nanometer-size carbon fibers utilized by this invention are formed in accordance with the continuous gas phase reaction process taught by U.S. Pat. No. 5,024,818 to Tibbetts et al.

The above achievements are made possible in pan by the use of one of the preferred thermoplastic resins to form the polymeric matrix of the composite material. The preferred thermoplastic resins exhibit a low surface tension, preferably no more than about 45 dynes per centimeter, such that the thermoplastic resin will more readily wet the surface of the vapor-grown carbon fibers. Contrary to the use of thermosets, such as epoxies used in the prior art, the use of the preferred thermoplastic resins permits extended shear mixing of the fiber/polymer mixture at temperatures which are sufficient to significantly reduce the viscosity of the mixture. As a result, dispersion of the carbon fibers by the thermoplastic resin is promoted, such that adhesion between the carbon fibers and the thermoplastic matrix is enhanced. In addition, use of one of the preferred solvents serves to granularize and reduce the volume of the mixture, so as to overcome problems associated with the handling of the nanometer-size carbon fibers of this invention.

While our invention has been described in terms of a preferred embodiment, it is apparent that other forms could be adopted by one skilled in the art- for example, by modifying the processing parameters such as the temperatures and durations employed, or by substituting appropriate materials which possess the required characteristics, or by altering the processing methods so as to accommodate larger quantities of the composite material or to promote alignment of the carbon fibers within the polymeric matrix. Accordingly, the scope of our invention is to be limited only by the following claims.

The embodiments of the invention in which an exclusive property or privilege is claimed are defined as follows:

1. A method for making a composite material, the method comprising the steps of:
   removing volatile materials from vapor-grown carbon fibers which have diameters of less than about 0.2 micrometer;
   forming an initial mixture comprising the carbon fibers, a thermoplastic resin, and a solvent, the solvent being present in sufficient amounts to promote relative movement between the carbon fibers and thereby promote densification of the initial mixture;
   blending the initial mixture for a duration which is sufficient to granularize the initial mixture and thereby form a granulated mixture comprising a plurality of granules;
   drying the granulated mixture so as to substantially remove the solvent and any water from the granules; and
   shear mixing the granulated mixture to form the composite material, the shear mixing being conducted at a temperature which is near the melting temperature of the thermoplastic resin and which is sufficient to reduce the viscosity of the granulated mixture and disperse the carbon fibers within the granulated mixture;
   whereby the reduced viscosity of the granulated mixture during the shear mixing step promotes dispersion of the carbon fibers, so as to promote adhesion of the thermoplastic resin to the carbon fibers.

2. A method as recited in claim 1 wherein the initial mixture comprises up to about 40 weight percent carbon fibers.

3. A method as recited in claim 1 wherein the solvent is acetone, the acetone being added in quantities of about 50 milliliters to about 200 milliliters for every 100 grams of the initial mixture.

4. A method as recited in claim 1 wherein the blending step comprises:
   dry blending the carbon fibers and the thermoplastic resin to form the initial mixture; and
   adding the solvent to the initial mixture while mixing for a duration which is sufficient to granularize the initial mixture and thereby form the granulated mixture comprising the plurality of granules.

5. A method as recited in claim 1 wherein the blending step comprises:
   mixing the solvent with the thermoplastic resin in sufficient amounts and at a sufficient temperature so as to at least partially dissolve the thermoplastic resin;
   adding the carbon fibers to the thermoplastic resin; and
   mixing the carbon fibers and the thermoplastic resin for a duration which is sufficient to granularize the initial mixture and thereby form the granulated mixture comprising the plurality of granules.

6. A method as recited in claim 1 wherein the thermoplastic resin has a surface tension of less than about 45 dynes per centimeter at about 20° C.

7. A method as recited in claim 1 further comprising the step of forming a composite article from the composite material.

8. A method for making a composite material comprising vapor-grown carbon fibers in a polymeric matrix, the method comprising the steps of:
   forming the carbon fibers so as to have a diameter of less than about 0.2 micrometer;
   removing volatile materials from the carbon fibers;
   dry blending the carbon fibers and a thermoplastic resin to form an initial mixture, the thermoplastic resin having a surface tension of less than about 45 dynes per centimeter at about 20° C.;
   adding a solvent to the initial mixture while concomitantly mixing the initial mixture for a duration which is sufficient to granularize the initial mixture and thereby form a granulated mixture comprising a plurality of granules;
   drying the granulated mixture in a substantial vacuum at a temperature and for a duration sufficient to substantially remove the solvent from the granules; and
   shear mixing the granulated mixture to form the composite material, the shear mixing being conducted at a temperature which is near the melting temperature of the thermoplastic resin and which is sufficient to reduce the viscosity of the granulated mixture;
   whereby the relatively low surface tension of the thermoplastic resin and the reduced viscosity of the granulated mixture during the shear mixing step promote wetting of the carbon fibers, so as to promote adhesion of the thermoplastic resin to the carbon fibers.

9. A method as recited in claim 8 wherein the initial mixture comprises as much as about 30 weight percent carbon fibers.

10. A method as recited in claim 8 wherein the volatile materials are removed from the carbon fibers by heating the carbon fibers to a temperature of at least about 400° C. in flowing nitrogen.

11. A method as recited in claim 8 wherein the solvent is acetone, the acetone being added in quantities of about 50 milliliters to about 200 milliliters for every 100 grams of the initial mixture.

12. A method as recited in claim 8 wherein the thermoplastic resin is selected from the group consisting of polycarbonates, polyethylenes, polyethylene terephthalate and nylon 6,6.

13. A method as recited in claim 8 further comprising the step of forming a composite article from the composite material, such that the carbon fibers are substantially absent from the surface of the composite article.

14. A method as recited in claim 13 wherein the carbon fibers have a substantially random orientation within the composite article.

15. A composite article formed from a composite material comprising:

a polymeric matrix comprising a thermoplastic resin, the thermoplastic resin being characterized by having a surface tension of less than about 45 dynes per centimeter at a temperature of about 20° C.; and vapor-grown carbon fibers dispersed in the polymeric matrix, the carbon fibers each having a diameter of less than about 0.2 micrometer and a length of less than about 5 micrometers;

whereby the carbon fibers are substantially absent from the surface of the composite article.

16. A composite article as recited in claim 15 wherein the composite article comprises as much as about 30 weight percent carbon fibers.

17. A composite article as recited in claim 15 wherein the carbon fibers have a substantially random orientation within the composite article.

* * * * *